Figure 1:
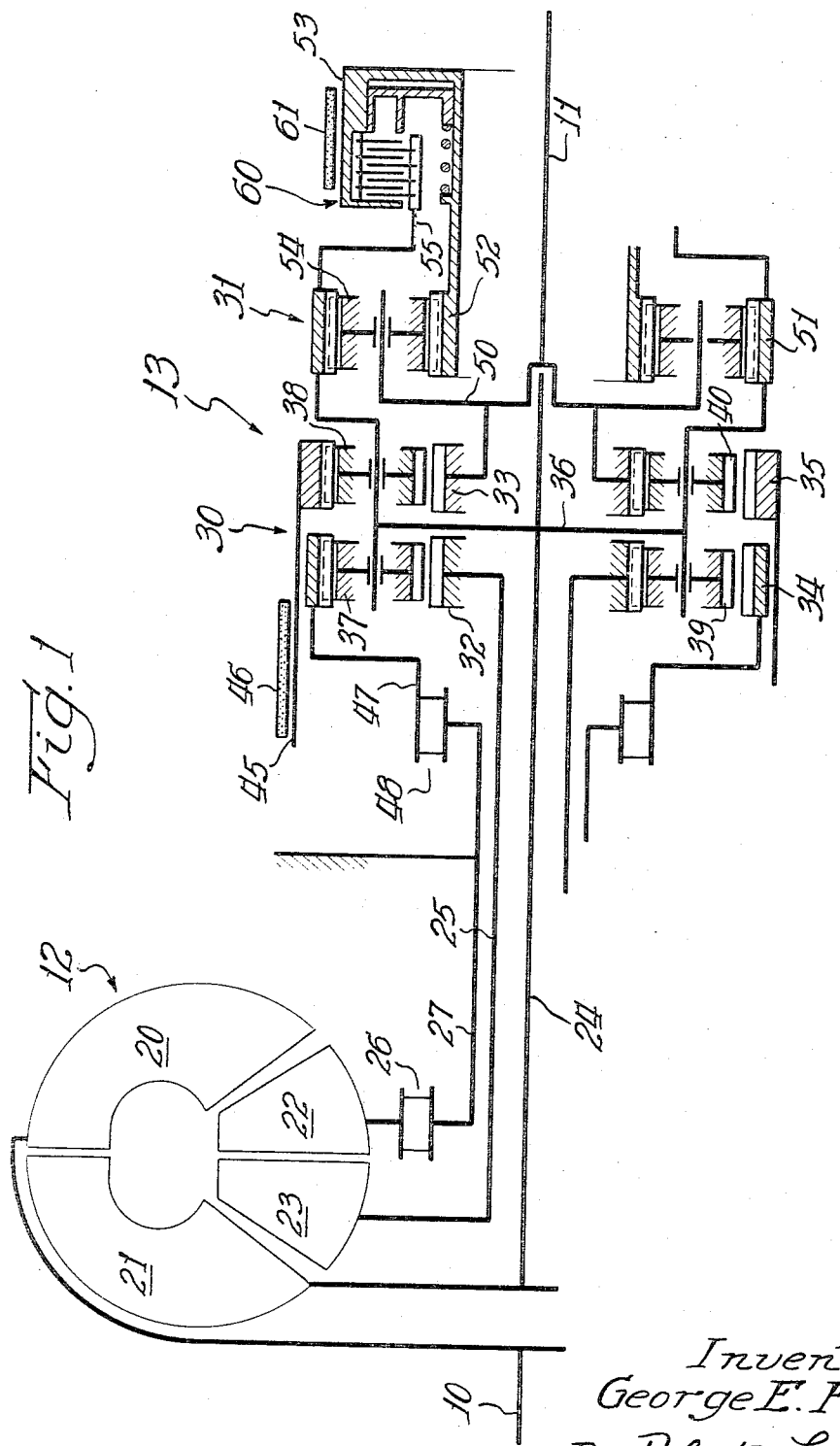

Inventor:
George E. Flinn
By: Robert L. Zieg Atty.

United States Patent Office 3,313,179
Patented Apr. 11, 1967

3,313,179
INFINITELY VARIABLE TYPE TRANSMISSION
George E. Flinn, Muncie, Ind., assignor to Borg-Warner Corporation, Chicago, Ill., a corporation of Illinois
Filed Aug. 3, 1964, Ser. No. 387,066
6 Claims. (Cl. 74—677)

This invention relates to a transmission of the infinitely variable type for an automotive vehicle.

It is an object of the present invention to provide an improved transmission for an automotive vehicle utilizing a torque converter having an impeller, two contra rotating turbines and a stator element in combination with planetary gearing for transmitting torque from the engine to the driving road wheels of the vehicle. The stator element operates in a conventional fashion and the second turbine element is utilized for driving the planetary gearing throughout a portion of the operating range of the transmission.

It is another object to provide a transmission of the type described utilizing a minimum number of friction engaging elements for providing an infinitely variable forward speed drive ratio and having in addition a reverse drive and a low speed forward drive ratio.

This invention consists of the novel constructions, arrangements and devices to be hereinafter described and claimed for carrying out the above stated objects and such other objects as will appear from the following description of a preferred form of the invention, illustrated with reference to the accompanying drawings, wherein:

FIGURE 1 is a cross-sectional view of a transmission embodying the principles of the present invention.

Referring to FIGURE 1, the transmission illustrated comprises an input shaft 10, an output shaft 11, a torque converter 12 and a planetary gear arrangement 13. The input shaft 10 is adapted to be connected to the driving engine of the vehicle and the output shaft 11 is adapted to be connected to the driven wheels of the vehicle.

The torque converter 12 comprises a bladed driving element or impeller 20, a first bladed driven element or turbine 21, a bladed reaction element or stator 22 and a second bladed reaction element or turbine 23. The turbine 21 is drivingly connected to a shaft 24; the turbine 23 is drivingly connected to a hollow shaft 25 concentric with shaft 24 and the stator 22 is connected by means of a one-way clutch 26 to a hollow shaft 27 which is fixed to the transmission case and is concentric with shafts 24 and 25.

The planetary gear section 13 comprises a forward and reverse gear set 30 and a low-speed drive gear set 31. The forward and reverse gear set 30 comprises a first sun gear 32 drivingly connected to the shaft 25 and thereby to the second turbine 23, a second sun gear 33 drivingly connected to the output shaft 11, a first ring gear 34 and a second ring gear 35. A planetary carrier element 36 is provided which is drivingly connected to the turbine 21 of the torque converter through shaft 24. A first set of planetary pinion gears 37 and 38 are provided which are rotatably journalled on the carrier 36 and which are in mesh with ring gears 34 and 35 respectively. A second pair of planetary gears 39 and 40 is provided rotatably journalled on the planetary carrier 36 and meshing with the planetary pinion gears 37 and 38 respectively. The planetary pinion gears 39 and 40 are also in driving mesh with the sun gears 32 and 33 respectively. The second ring gear 35 is connected to a drum member 45 which is provided with a brake 46. The first ring gear 34 is connected to a hub member 47 which is in turn connected to the fixed shaft 27 by means of a one-way brake 48.

The low-speed gear set includes a carrier member 50 drivingly connected to the output shaft 11, a ring gear 51 drivingly connected to the carrier member 36 of the forward/reverse gear set 13 and a sun gear 52 which is connected to a brake drum 53. Planetary pinion gears 54 are journalled on the planetary carrier 50 and mesh with the ring and sun gears 51 and 52. The ring gear 51 has an extension 55 which extends into the drum 53. A clutch 60 is provided which is engageable to connect the drum 53 and the extension 55 of the ring gear 51. A low-speed brake 61 is provided for the drum 53 which may be engaged to hold the sun gear 52 of the low-speed planetary gear set to provide a low-speed drive.

In operation, the input shaft 10 is driven by the vehicle engine (not shown) and functions to drive the impeller 20. For normal forward drive operation clutch 60 is engaged which locks up the low-speed gear set 31 and directly connects the turbine 21 through shaft 24 and carrier 36 to the output shaft 11.

As the impeller 20 is driven by the input shaft 10 fluid within the torque converter is pumped into the blades of the turbine 21 imparting torque thereto which is transmitted to the output shaft 11. For low forward speeds, or high torque conditions the one-way brake 26 engages, holding the stator 22 for taking reaction of the fluid within the torque converter 12 in a conventional manner. Fluid pumped through the blades of the turbine 21 acts against the blades of the second turbine 23 driving it in the reverse direction. The blades of the second turbine 23 are so shaped as to provide the drive of the second turbine 23 in the reverse direction as is well known in the prior art, for example, as illustrated in FIGURES 1 and 3 of U.S. Patent No. 2,383,981 in the name of Lysholm. This reverse driving torque is transmitted through the shaft 25 to the sun gear 32 of the planetary gear set 30. For low forward speeds the one-way brake 48 also engages holding the ring gear 34 stationary whereby it functions to take reaction for the gear set 30.

The reverse driving torque of the sun gear 32 is converted into a forward driving torque due to the use of the double sets of planetary pinion gears 39/40 and 37/38 which thereby drive the carrier 36 and the driven shaft 11 in a forward direction.

At higher forward speed when the torque converter approaches the fluid coupling stage the one-way brake 26 releases and the first stator 22 is allowed to float freely. In this speed stage of operation and the direction of flow of fluid impinging on the turbine 23 is reversed so that it acts upon the backside of the blades thereof and imparts a forward driving torque to the shaft 25 and the sun gear 32. For this stage of operation the one-way brake 48 is also released and the planetary gear set 30 rotates substantially at a 1–1 ratio with respect to the output shaft 11.

The converter 12 provides a 3.2 torque ratio at stall by use of the contra rotating turbine to transmit torque in a forward direction to the output shaft. A torque conversion in the range of 3.2 is available as compared to the 2.0 torque ratio normally obtained by conventional three element converters. Thus the converter of the present invention produces a high enough torque ratio at stall to provide for normal driving of a vehicle without any shifting of gear ratio.

A low speed forward drive is available by engagement of the brake 61. When the brake 61 is engaged the sun gear 52 is held stationary and the ring gear 51 being driven in a forward direction by the turbine 21 will drive the carrier 50 and thereby the output shaft 11 in a forward direction and reduce speed drive ratio of 1.52 to 1. Thus in the low-speed drive condition a drive ratio is available of 3.2 provided by the converter times 1.52 provided by the planetary gear set 31 to provide an over-all drive ratio of 4.9. Reverse drive ratio is available by engagement of brake 46. Engagement of brake 46 holds the ring gear 35 against rotation and as the carrier 36 is driven in the forward direction by the turbine 21 with the ring gear 35 held against rotation, due to the action of the innermeshed planetary pinions 38 and 40, the sun gear 33 and thus the output shaft 11 will be driven in the reverse direction.

It will be apparent from the above description that applicant has provided an extremely smooth transmission which operates in the normal driving range in a satisfactory manner by use of an improved torque converter having a torque ratio high enough to obviate the necessity of any shifting of gears by engagement or disengagement of friction elements as the vehicle accelerates to driving speeds. In the normal drive range of the transmission, the clutch 60 remains engaged and brakes 46 and 61 remain disengaged. Applicant has provided a transmission which includes only one clutch and two friction brakes to provide an infinitely variable forward drive ratio, a low speed forward drive ratio and a reverse drive ratio.

By means of the novel and improved arrangement whereby the driving torque provided by a contra rotating turbine element is added to the torque provided by the turbine element of a torque converter through the use of a planetary gear set, the infinitely variable drive with no shifting incorporated is made possible. Further the transmission provided by applicant is adapted to be operated by an extremely simplified fluid control system since a complex valve structure to provide shifting between progressive gear ratios from low to high speed drive is not necessary.

The present invention is not to be limited to the specific constructions and arrangements shown and described except only insofar as the claims may be so limited, as it will be understood by those skilled in the art that changes may be made without departing from the principles of the invention.

I claim:

1. An infinitely variable ratio transmission having input and output shafts and including a torque converter and a planetary gear set, said torque converter comprising an impeller element, two turbine elements, and a stator element, one of said turbine elements having blades thereon adapted to rotate said one turbine element in a reverse direction with respect to said other turbine element, said planetary gear set including a ring gear, a sun gear, a planetary carrier, and two sets of inter-meshing pinion gears mounted on said carrier, one set of pinion gears meshing with said sun gear and one set meshing with said ring gear, a clutch engageable to connect the carrier element to said output shaft, a one-way brake for said ring gear, means connecting said other turbine element to said clutch whereby said other turbine element will drive said output shaft in a forward direction when said clutch is engaged, said one turbine being connected to said sun gear and transmitting torque in a forward direction to said carrier element while rotating reversely with respect to said other turbine element.

2. A transmission as claimed in claim 1 including an additional planetary gear set having first, second and third elements said first element being connected to said planetary carrier said second element being connected to said output shaft and a friction brake for said third element whereby a low speed forward drive ratio is provided from said one turbine element to said output shaft when said friction brake is engaged.

3. An infinitely variable ratio transmission having input and output shafts and including a torque converter and a planetary gear set, said torque converter comprising an impeller element, two turbine elements and a stator element, said planetary gear set including first and second ring gears and first and second sun gears, a planetary carrier having a first set of inter-meshing planetary pinion gears some of which mesh with said first ring gear and some of which mesh with said first sun gear said planetary carrier having a second set of inter-meshing pinion gears some of which mesh with said second ring gear and some of which mesh with said second sun gear, said planetary carrier being connected to one of said turbine elements, said first sun gear being connected to the other of said turbine elements, said second sun gear being connected to the output shaft, means engageable to connect said planetary carrier to the output shaft, a one-way brake for said first ring gear, means connecting said one turbine element to said engageable means to drive said output shaft in a forward direction when said engageable means is engaged and said other turbine element having blades thereon adapted to drive said other turbine element in a reverse direction with respect to said one turbine element and to transmit torque in a forward direction to said carrier element through said first planetary gear set.

4. A transmission as claimed in claim 3, including a friction brake for said second ring gear engageable to provide a reverse drive ratio to said output shaft from said one turbine element through said second planetary gear set.

5. A transmission as claimed in claim 3 including an additional planetary gear set having first, second and third elements, said first element being connected to said planetary carrier, said second element being connected to said output shaft, a friction brake for said third element whereby a low speed forward drive ratio is provided from said one turbine element to said output shaft when said friction brake is engaged.

6. An infinitely variable ratio transmission having input and output shafts and including a torque converter and a planetary gear set said torque converter comprising an impeller element two turbine elements and a stator element, said planetary gear set including first and second ring gears and first and second sun gears, a planetary carrier having a first set of inter-meshing planetary pinion gears some of which mesh with said first ring gear and some of which mesh with said first sun gear, said planetary carrier having a second set of inter-meshing pinion gears some of which mesh with said second ring gear and some of which mesh with said second sun gear, said planetary carrier being connected to one of said turbine elements, said first sun gear being connected to the other of said turbine elements, said second sun gear being connected to the output shaft, means engageable to connect said planetary carrier to the output shaft, a one-way brake for said first ring gear, means connecting said one turbine element to said engageable means to drive said output shaft in a forward direction when said engageable means is engaged and said other turbine element having blades thereon adapted to drive said other turbine element in a reverse direction with respect to said one turbine element and to transmit torque in a forward direction to said carrier element through said first planetary gear set, a friction brake for said second ring gear engageable to provide a reverse drive ratio to said output shaft from said one turbine element through said planetary gear set, and said transmission including an additional planetary gear set having a first, second and third element said first element being connected to said planetary carrier, said second element being connected to said output shaft and a friction brake for said third element whereby a low speed forward drive ratio is provided from said one turbine element to said output shaft when said friction brake is engaged.

References Cited by the Examiner
UNITED STATES PATENTS

| | | | |
|---|---|---|---|
| 2,280,015 | 4/1942 | Tipton | 74—677 |
| 2,383,981 | 9/1945 | Lysolm | 74—677 |
| 2,402,164 | 6/1946 | Kelbel | 74—677 |
| 2,550,082 | 4/1951 | Orr | 60—54 |
| 2,786,365 | 3/1957 | Lammerz | 74—677 |
| 2,850,918 | 9/1958 | Pollard | 74—645 |
| 2,883,881 | 4/1959 | Baker | 74—677 |
| 2,956,448 | 10/1960 | Edsall | 74—677 |
| 3,020,781 | 2/1962 | Burtnett | 74—688 |
| 3,237,481 | 3/1966 | Kelley | 74—677 |

References Cited by the Applicant
UNITED STATES PATENTS 3,105,396  10/1963  Dundore et al.

MARK NEWMAN, *Primary Examiner.*

DAVID J. WILLIAMOWSKY, *Examiner.*

J. R. BENEFIEL, *Assistant Examiner.*